US012746849B2

(12) United States Patent
Isaji et al.

(10) Patent No.: US 12,746,849 B2
(45) Date of Patent: Sep. 29, 2026

(54) ON-BOARD SWITCHING DEVICE

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Yusuke Isaji, Osaka (JP); Takayoshi Bando, Osaka (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 607 days.

(21) Appl. No.: 18/546,659

(22) PCT Filed: Feb. 1, 2022

(86) PCT No.: PCT/JP2022/003712
§ 371 (c)(1),
(2) Date: Aug. 16, 2023

(87) PCT Pub. No.: WO2022/176592
PCT Pub. Date: Aug. 25, 2022

(65) Prior Publication Data

US 2024/0131963 A1 Apr. 25, 2024
US 2024/0227623 A9 Jul. 11, 2024

(30) Foreign Application Priority Data

Feb. 22, 2021 (JP) ................................ 2021-025924

(51) Int. Cl.
*B60L 58/19* (2019.01)
*H02J 7/50* (2026.01)
(Continued)

(52) U.S. Cl.
CPC .............. *B60L 58/19* (2019.02); *H02J 7/575* (2026.01); *H02J 7/62* (2026.01); *H02J 7/94* (2026.01)

(58) Field of Classification Search
CPC ... B60L 58/19; H02J 7/62; H02J 7/575; H02J 7/94
(Continued)

(56) References Cited

U.S. PATENT DOCUMENTS 5,747,966 A 5/1998 Minamoto
10,608,465 B2 * 3/2020 Aubin .................... H02J 7/485
(Continued)

FOREIGN PATENT DOCUMENTS

JP 5-236608 A 9/1993
JP 07-212980 A 8/1995
(Continued)

OTHER PUBLICATIONS

International Search Report, Application No. PCT/JP2022/003712, mailed Apr. 19, 2022. ISA/Japan Patent Office.

*Primary Examiner* — Allyson N Trail
(74) *Attorney, Agent, or Firm* — Brooks Kushman P.C.

(57) ABSTRACT

An on-board switching device includes: a switching circuit; a first conduction path through which a current flows in a series connection state and no current flows in a parallel connection state; a second conduction path through which a current flows in the parallel connection state and no current flows in the series connection state; a third conduction path that forms a path between a negative electrode of a first battery and a positive electrode of a second battery in the series connection state and forms a path between both positive electrodes or between both negative electrodes of the first battery and the second battery in the parallel
(Continued)

connection state; and a current detection unit that detects a current flowing through the third conduction path.

1 Claim, 2 Drawing Sheets

(51) Int. Cl.
*H02J 7/62* (2026.01)
*H02J 7/94* (2026.01)

(58) Field of Classification Search
USPC .......................................................... 320/117
See application file for complete search history.

(56) References Cited

U.S. PATENT DOCUMENTS

| | | | | |
|---|---|---|---|---|
| 10,654,430 | B2 * | 5/2020 | Kontani | B60R 16/033 |
| 11,050,268 | B2 | 6/2021 | Oishi et al. | |
| 11,752,959 | B2 * | 9/2023 | Mizutani | B60R 16/03 307/10.1 |
| 11,932,121 | B2 * | 3/2024 | Jeannard | B60L 58/10 |
| 12,040,639 | B2 * | 7/2024 | Hakushima | H02J 7/575 |
| 2020/0185936 | A1 | 6/2020 | Oishi et al. | |
| 2024/0178697 | A1 * | 5/2024 | Morii | H02J 7/34 |
| 2024/0300380 | A1 * | 9/2024 | Isaji | B60L 58/19 |
| 2025/0206190 | A1 * | 6/2025 | Kurachi | B60L 58/19 |

FOREIGN PATENT DOCUMENTS

| | | | |
|---|---|---|---|
| JP | 2007-274830 | A | 10/2007 |
| JP | 2011-97771 | A | 5/2011 |
| JP | 2020-150784 | A | 9/2020 |

* cited by examiner

ON-BOARD SWITCHING DEVICE

CROSS-REFERENCE TO RELATED APPLICATIONS

This application is the U.S. national stage of PCT/JP2022/003712 filed on Feb. 1, 2022, which claims priority of Japanese Patent Application No. JP 2021-025924 filed on Feb. 22, 2021, the contents of which are incorporated herein.

TECHNICAL FIELD

The present disclosure relates to an on-board switching device.

BACKGROUND

The vehicle power supply device disclosed in JP 2007-274830 A is a device that can connect a first power storage means and a second power storage means in series or in parallel. In this vehicle power supply device, when the first power storage means and the second power storage means are connected in series to an inverter, a control means turns on a third switch means to energize one charge resistor. The control device turns on a first switch means after the energization, and constitutes a circuit for series connection.

In the systems, including the technology as in JP 2007-274830 A, that can switch a plurality of batteries switched between a series connection state and a parallel connection state, it is desirable to accurately grasp the current flowing between the batteries, both in the series connection state and in the parallel connection state. However, merely adding a plurality of current sensors may lead to an increase in size and complexity of the configuration.

Therefore, an object of the present disclosure is to more easily provide a device that can switch a plurality of batteries between a series connection state and a parallel connection state and that can detect a current flowing between the batteries both in the series connection state and in the parallel connection state.

SUMMARY

An on-board switching device for a vehicle in the present disclosure is an on-board switching device used in an on-board power supply system including a battery unit that includes at least a first battery and a second battery, and a switching circuit that is switched between a series connection state where the first battery and the second battery are connected in series and a parallel connection state where the first battery and the second battery are connected in parallel The on-board switching device includes the switching circuit; a first conduction path that is a path where a current is allowed to flow in the series connection state and a current does not flow in the parallel connection state; a second conduction path that is a path where a current is allowed to flow in the parallel connection state and a current does not flow in the series connection state; a third conduction path that forms a path between a negative electrode of the first battery and a positive electrode of the second battery in the series connection state, and forms a path between both positive electrodes or between both negative electrodes of the first battery and the second battery in the parallel connection state; and a current detection unit that detects a current flowing through the third conduction path.

Advantageous Effects

The on-board switching device according to the present disclosure can more easily provide a device that can switch a plurality of batteries between a series connection state and a parallel connection state and that can detect a current flowing between the batteries both in the series connection state and in the parallel connection state.

DETAILED DESCRIPTION OF PREFERRED EMBODIMENTS

Figure 1:
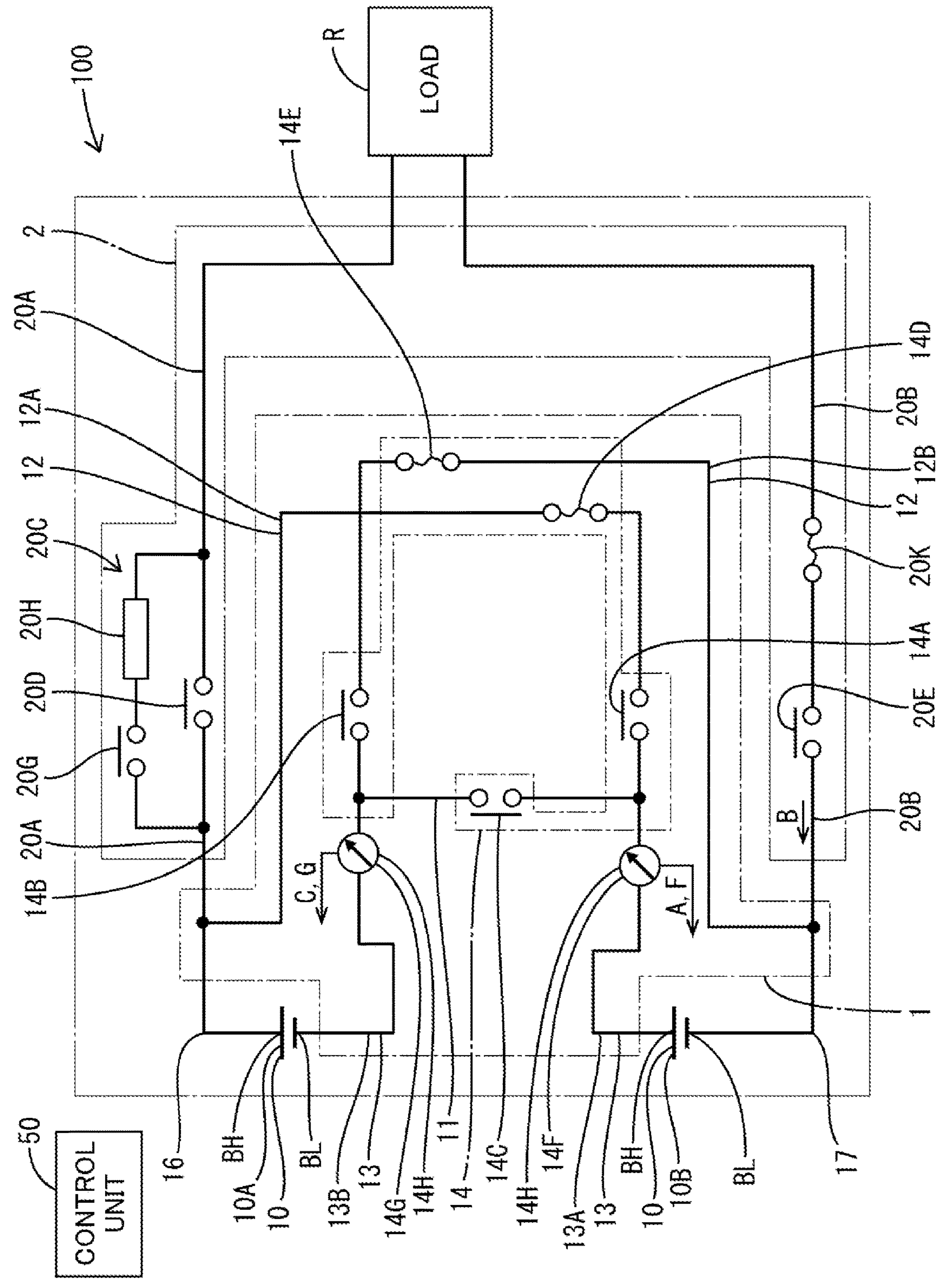
FIG. 1 is a schematic diagram conceptually illustrating an on-board power supply system including an on-board switching device according to a first embodiment.

Hereinafter, embodiments of the present disclosure will be listed and exemplified. The features of [1] to [4] described below may be combined in any manner without contradiction.

An on-board switching device of the present disclosure is used in an on-board power supply system including a battery unit that includes at least a first battery and a second battery, and a switching circuit that is switched between a series connection state where the first battery and the second battery are connected in series and a parallel connection state where the first battery and the second battery are connected in parallel. The on-board switching device includes a switching circuit, a first conduction path, a second conduction path, a third conduction path, and a current detection unit. The first conduction path is a path where a current is allowed to flow in the series connection state and a current does not flow in the parallel connection state. The second conduction path is a path where a current is allowed to flow in the parallel connection state and a current does not flow in the series connection state. The third conduction path forms a path between a negative electrode of the first battery and a positive electrode of the second battery in the series connection state, and forms a path between both positive electrodes or between both negative electrodes of the first battery and the second battery in the parallel connection state. The current detection unit detects a current flowing through the third conduction path.

In the on-board switching device of [1] described above, the third conduction path forms a path between the electrodes and allows the current to flow therethrough both in the series connection state and in the parallel connection state. Since the current detection unit is provided in the third conduction path, the current between the batteries can be detected by the common current detection unit both in the series connection state and in the parallel connection state. Hence, a device that can detect the current flowing between the batteries both in the series connection state and in the parallel connection state is more easily provided.

In the on-board switching device of [1] described above, the third conduction path includes a first common path and a second common path. The first common path is a conduction path for conducting electricity between both positive electrodes of the first battery and the second battery in the parallel connection state. The second common path is a conduction path for conducting electricity between both negative electrodes of the first battery and the second battery in the parallel connection state. The current detection unit may include a first detection unit that detects a current flowing through the first common path and a second detection unit that detects a current flowing through the second common path.

The on-board switching device described in [2] above can more accurately grasp the current generated between the batteries in the parallel connection state, both in the path on the positive electrode side and in the path on the negative electrode side.

In the on-board switching device of [1] or [2] described above, the second conduction path may include an inter-positive electrode conduction path and an inter-negative electrode conduction path. The inter-positive electrode conduction path forms a path between both positive electrodes of the first battery and the second battery in the parallel connection state. The inter-negative electrode conduction path forms a path between both negative electrodes of the first battery and the second battery in the parallel connection state. Furthermore, the second conduction path may include a first fuse provided in the inter-positive electrode conduction path and a second fuse provided in the inter-negative electrode conduction path.

The on-board switching device described in [3] above can forcibly cut off the energization of the conduction path in both cases where an excessive current is generated in the conduction path between the positive electrodes and where an excessive current is generated in the conduction path between the negative electrodes in the parallel connection state.

The on-board power supply system may include a power path that is a path for transmitting power from the battery unit both in the series connection state and in the parallel connection state. The power path is provided with an external fuse having a function of cutting off energization of the power path. In the on-board switching device of [3] described above, the rated currents of the first fuse and the second fuse may be smaller than the rated current of the external fuse.

In the on-board switching device described in [4] above, the first fuse and the second fuse can be made smaller in scale. The path between the batteries in the parallel connection state is a path through which a relatively low current flows with respect to the power path. Therefore, the size of the fuses can be easily reduced when the first fuse and the second fuse are arranged in such path.

First Embodiment

FIG. 1 exemplifies an on-board power supply system 100 provided with an on-board switching device 1 according to the first embodiment. The on-board power supply system 100 is used as a power supply for operating a load R (for example, a motor for driving wheels, and the like) of a vehicle mounted with the on-board power supply system 100. The on-board power supply system 100 includes a battery unit 10, a high potential side conduction path 16, a low potential side conduction path 17, the on-board switching device 1, and a junction box unit 2. The battery unit 10 includes a first battery 10A and a second battery 10B. The on-board switching device 1 includes a first conduction path 11, a second conduction path 12, a third conduction path 13, a switching circuit 14, and a current detection unit 14H. The on-board switching device 1 is used for the on-board power supply system 100.

The first battery 10A and the second battery 10B in the battery unit 10 include a plurality of cell units configured as unit cells, and have a configuration where the cell units are integrally combined. The cell units are not illustrated. In each of the first battery 10A and the second battery 10B, the highest potential electrode of the plurality of unit cells electrically connected in series is a positive electrode BH, and the lowest potential electrode of the plurality of unit cells electrically connected in series is a negative electrode BL.

In the present disclosure, "electrically connected" is desirably a configuration where both connection targets are connected in a conductive state (state where current can flow) such that potentials of both the connection targets become equal. However, the present disclosure is not limited to this configuration. For example, "electrically connected" may be a configuration where both connection targets are connected in a conductible state while an electric component is interposed between both the connection targets.

[Configurations of High Potential Side Conduction Path and Low Potential Side Conduction Path]

One end of the high potential side conduction path 16 is electrically connected to the positive electrode BH of the first battery 10A. One end of the low potential side conduction path 17 is electrically connected to the negative electrode BL of the second battery 10B.

[Configuration of On-Board Switching Device]

The second conduction path 12 allows a current to flow therethrough in a parallel connection state in which the first battery 10A and the second battery 10B are electrically connected in parallel (hereinafter, simply referred to as parallel connection state). The second conduction path 12 is a path through which no current flows in a series connection state where the first battery 10A and the second battery 10B are electrically connected in series (hereinafter, simply referred to as series connection state) The second conduction path 12 includes an inter-positive electrode conduction path 12A and an inter-negative electrode conduction path 12B. One end of the inter-positive electrode conduction path 12A is electrically connected to the other end of the high potential side conduction path 16. One end of the inter-negative electrode conduction path 12B is electrically connected to the other end of the low potential side conduction path 17.

The third conduction path 13 forms a path between the negative electrode BL of the first battery 10A and the positive electrode BH of the second battery 10B in the series connection state, and forms a path between both the positive electrodes BH of the first battery 10A and the second battery 10B or between both the negative electrodes BL in the parallel connection state. The third conduction path 13 includes a first common path 13A and a second common path 13B. One end of the first common path 13A is electrically connected to the positive electrode BH of the second battery 10B. The other end of the first common path 13A is electrically connected to the other end of the inter-positive electrode conduction path 12A. One end of the second common path 13B is electrically connected to the negative electrode BL of the first battery 10A. The other end of the second common path 13B is electrically connected to the other end of the inter-negative electrode conduction path 12B.

The high potential side conduction path 16, the inter-positive electrode conduction path 12A, and the first common path 13A form a path for conducting electricity between both the positive electrodes BH of the first battery 10A and the second battery 10B in the parallel connection state. That is, the first common path 13A is a conduction path for conducting electricity between both the positive electrodes BH of the first battery 10A and the second battery 10B in the parallel connection state. The low potential side conduction path 17, the inter-negative electrode conduction path 12B, and the second common path 13B form a path for conducting electricity between both the negative electrodes BL of the first battery 10A and the second battery 10B in the parallel connection state. That is, the second common path 13B is a conduction path for conducting electricity between both the negative electrodes BL of the first battery 10A and the second battery 10B in the parallel connection state.

The first conduction path 11 is a path where a current is allowed to flow in the series connection state and a current does not flow in the parallel connection state. One end of the first conduction path 11 is electrically connected to the other end of the second common path 13B and the other end of the inter-negative electrode conduction path 12B. The other end of the first conduction path 11 is electrically connected to the other end of the first common path 13A and the other end of the inter-positive electrode conduction path 12A. That is, the first conduction path 11 is electrically connected in series to the first battery 10A and the second battery 10B via the first common path 13A and the second common path 13B.

[Configuration of Switching Circuit]

The switching circuit 14 has a function of switching between the series connection state where the first battery 10A and the second battery 10B are connected in series and the parallel connection state where they are connected in parallel. The switching circuit 14 includes a first parallel switch 14A, a second parallel switch 14B, a series switch 14C, a first fuse 14D, and a second fuse 14E.

The first parallel switch 14A, the second parallel switch 14B, and the series switch 14C are constituted by, for example, relay switches or semiconductor switches such as MOSFETs. The first parallel switch 14A is provided to be interposed in the inter-positive electrode conduction path 12A. The second parallel switch 14B is provided to be interposed in the inter-negative electrode conduction path 12B. The series switch 14C is provided to be interposed in the first conduction path 11. The first parallel switch 14A, the second parallel switch 14B, and the series switch 14C are configured to be switchable between an on state and an off state by a control unit 50 including, for example, an information processing device such as a microcomputer. The control unit 50 is provided, for example, outside the on-board power supply system 100.

The first fuse 14D is provided to be interposed in the inter-positive electrode conduction path 12A so as to be in series with the first parallel switch 14A. In the inter-positive electrode conduction path 12A, the first fuse 14D is positioned on one end side relative to the first parallel switch 14A. The second fuse 14E is provided to be interposed in the inter-negative electrode conduction path 12B so as to be in series with the second parallel switch 14B. In the inter-negative electrode conduction path 12B, the second fuse 14E is positioned on one end side relative to the second parallel switch 14B. The first fuse 14D and the second fuse 14E are constituted by thermal fuses, for example. When the switching circuit 14 is in the parallel connection state, the first fuse 14D and the second fuse 14E are blown out in accordance with their own cutoff characteristics (for example, rated current) to cut off the energization in the inter-positive electrode conduction path 12A and the inter-negative electrode conduction path 12B. That is, the on-board switching device 1 includes first fuse 14D and second fuse 14E which cut off the energization of the second conduction path 12.

[Configuration of Current Detection Unit]

The current detection unit 14H includes a first detection unit 14F and a second detection unit 14G. The first detection unit 14F is provided to be interposed in the first common path 13A. The second detection unit 14G is provided to be interposed in the second common path 13B. The first detection unit 14F and the second detection unit 14G include, for example, a resistor and a differential amplifier, and are configured to be capable of outputting, as a current value, a value indicating a current flowing through each of the first common path 13A and the second common path 13B (specifically, an analog voltage according to the value of the current flowing through each of the first common path 13A and the second common path 13B). The first detection unit 14F detects the state of the current flowing through the first common path 13A, and the second detection unit 14G detects the state of the current flowing through the second common path 13B. The current values output from the first detection unit 14F and the second detection unit 14G can be input to the control unit 50, for example. That is, the current detection unit 14H detects the current flowing through the first common path 13A (third conduction path 13) and the second common path 13B (third conduction path 13).

[Configuration of Junction Box Unit]

The junction box unit 2 has a function of being able to supply power from the battery unit 10 to the load R or the like. The junction box unit 2 includes a high potential side power path 20A serving as the power path 20, a low potential side power path 20B serving as the power path 20, a high potential side switch 20D, a bypass unit 20C, a low potential side switch 20E, and an external fuse 20K.

The power path 20 is a path for transmitting power from the battery unit 10, both in the series connection state and in the parallel connection state. One end of the high potential side power path 20A is electrically connected to the other end of the high potential side conduction path 16 and one end of the inter-positive electrode conduction path 12A. One end of the low potential side power path 20B is electrically connected to the other end of the low potential side conduction path 17 and one end of the inter-negative electrode conduction path 12B.

The high potential side switch 20D is provided to be interposed in the high potential side power path 20A. The bypass unit 20C is provided to be electrically connected in parallel to the high potential side switch 20D. The bypass unit 20C includes a bypass switch 20G and a resistor 20H. The bypass switch 20G and the resistor 20H are electrically connected in series. The bypass switch 20G is interposed between the resistor 20H and the high potential side conduction path 16.

The low potential side switch 20E is provided to be interposed in the low potential side power path 20B. The high potential side switch 20D, the bypass switch 20G, and the low potential side switch 20E are constituted by, for example, relay switches or semiconductor switches such as MOSFETs.

The external fuse 20K is provided to be interposed in the low potential side power path 20B on the opposite side of the low potential side conduction path 17 across the low potential side switch 20E. The external fuse 20K is constituted by a thermal fuse, for example. When the switching circuit 14 is in the series connection state, the external fuse 20K is blown out in accordance with its own cutoff characteristics (for example, rated current) to cut off the energization in the low potential side power path 20B. That is, the power path 20 is provided with the external fuse 20K having a function of cutting off energization of the power path 20. The load R is electrically connected between the other end side of the high potential side power path 20A and the other end side of the low potential side power path 20B.

[Case where Switching Circuit is in Parallel Connection State]

The case of the parallel connection state where the first battery 10A and the second battery 10B of the battery unit 10 are electrically connected in parallel will be described. In this case, for example, the control unit 50 switches the first parallel switch 14A and the second parallel switch 14B to the on state and switches the series switch 14C to the off state. This brings the first battery 10A and the second battery 10B into a state of being electrically connected in parallel. Thus, the switching circuit 14 is brought into the parallel connection state. Thereafter, the high potential side switch 20D and the low potential side switch 20E are switched to the on state, so that power is supplied to the load R. At this time, the high potential side conduction path 16, the inter-positive electrode conduction path 12A, and the first common path 13A form a path for conducting electricity between both the positive electrodes BH of the first battery 10A and the second battery 10B. Together with this, the low potential side conduction path 17, the inter-negative electrode conduction path 12B, and the second common path 13B form a path for conducting electricity between both the negative electrodes BL of the first battery 10A and the second battery 10B.

At this time, the current generated from the second battery 10B is detected as a current value A by the first detection unit 14F provided in the first common path 13A. Together with this, the current generated from the first battery 10A is detected as a current value C by the second detection unit 14G provided in the second common path 13B.

The first detection unit 14F and the second detection unit 14G detect the currents in the first common path 13A and the second common path 13B as the current values A and C, simultaneously, for example. Then, the current values A and C having been detected are input to the control unit 50 simultaneously. In the control unit 50, the current value A and the current value C are added. A current value B, which is a calculation result of this addition, corresponds to the current flowing through the low potential side power path 20B (high potential side power path 20A). The current value B thus obtained is a value at the same time as when the first detection unit 14F and the second detection unit 14G detect the currents in the first common path 13A and the second common path 13B. Thus, the control unit 50 can grasp the magnitude of the current flowing through the low potential side power path 20B as the current value B, on the basis of the current values C and A corresponding to the magnitudes of the currents generated from the first battery 10A and the second battery 10B.

When the switching circuit 14 is in the parallel connection state, if the series switch 14C is inadvertently switched to the on state or short-circuited, the positive electrode BH and the negative electrode BL of each of the first battery 10A and the second battery 10B get into a short-circuited state. In this case, the first fuse 14D and the second fuse 14E are blown out so that the first parallel switch 14A, the second parallel switch 14B, and the series switch 14C are prevented from breaking down. The control unit 50 is configured to be able to monitor whether or not the magnitude of the current flowing through the first common path 13A (third conduction path 13) and the magnitude of the current flowing through the second common path 13B (third conduction path 13) have reached a predetermined threshold. For example, in a case where the series switch 14C is inadvertently switched to the on state or short-circuited, the first fuse 14D and the second fuse 14E cannot be blown out when the magnitudes of the currents flowing through the first fuse 14D and the second fuse 14E increase but the currents not satisfying the cutoff characteristics (rated current) thereof flow. In such case, when the control unit 50 determines that the magnitude of the current flowing through the first common path 13A (third conduction path 13) and the magnitude of the current flowing through the second common path 13B (third conduction path 13) have reached the predetermined threshold, the first parallel switch 14A and the second parallel switch 14B are switched to the off state, so that the energization of the second conduction path 12 can be cut off.

In the case of the parallel connection state, the current generated from the first battery 10A flows through the inter-positive electrode conduction path 12A, and the current generated from the second battery 10B flows through the inter-negative electrode conduction path 12B. On the other hand, in the case of the parallel connection state, a current larger than the current flowing through each of the inter-positive electrode conduction path 12A and the inter-negative electrode conduction path 12B (that is, both the current generated from the first battery 10A and the current generated from the second battery 10B) flows through the external fuse 20K. Therefore, the rated currents of the first fuse 14D and the second fuse 14E are made smaller than the rated current of the external fuse 20K.

[Case where Switching Circuit is in Series Connection State]

The case of the series connection state where the first battery 10A and the second battery 10B of the battery unit 10 are electrically connected in series will be described. In this case, for example, the control unit 50 switches the first parallel switch 14A and the second parallel switch 14B to the off state and switches the series switch 14C to the on state. This brings the first battery 10A and the second battery 10B into a state of being electrically connected in series. Thus, the switching circuit 14 is brought into the series connection state. Thereafter, the high potential side switch 20D and the low potential side switch 20E are switched to the on state, so that power is supplied to the load R.

At this time, the current flowing through the first common path 13A is detected as a current value F by the first detection unit 14F provided in the first common path 13A, and the current flowing through the second common path 13B is detected as a current value G by the second detection unit 14G provided in the second common path 13B. The first detection unit 14F and the second detection unit 14G detect currents in the first common path 13A and the second common path 13B simultaneously, for example. Then, the current values F and G are input to the control unit 50 simultaneously. The first battery 10A and the second battery 10B are electrically connected in series. Therefore, the current values F and G are the same value. The current flowing through the low potential side power path 20B (high potential side power path 20A) also has the same value as the current value F (current value G). Thus, the control unit 50 can grasp, as the current values F and G, the magnitude of the current generated from the battery unit 10.

The control unit 50 is configured to be able to monitor whether or not the magnitude of the current flowing through the third conduction path 13 (first conduction path 11) has reached a predetermined threshold. For example, in a case where a ground fault occurs in the load R or the like, the external fuse 20K cannot be blown out when the magnitude of the current flowing through the external fuse 20K increases but the current not satisfying the cutoff characteristics (rated current) thereof flows. In such case, when the control unit 50 determines that the magnitude of the current flowing through the third conduction path 13 (first conduction path 11) has reached the predetermined threshold, the series switch 14C is switched to the off state, so that the energization of the first conduction path 11 can be cut off.

Next, effects of the configuration according to the present disclosure will be exemplified.

The on-board switching device 1 of the present disclosure is used in the on-board power supply system 100 including the battery unit 10 and the switching circuit 14. The battery unit 10 includes the first battery 10A and the second battery 10B. The switching circuit 14 is switched between the series connection state where the first battery 10A and the second battery 10B are connected in series and the parallel connection state where they are connected in parallel. The on-board switching device 1 includes the switching circuit 14, the first conduction path 11, the second conduction path 12, the third conduction path 13, and the current detection unit 14H. The first conduction path 11 is a path where a current is allowed to flow in the series connection state and a current does not flow in the parallel connection state. The second conduction path 12 is a path where a current is allowed to flow in the parallel connection state and a current does not flow in the series connection state. The third conduction path 13 forms a path between the negative electrode BL of the first battery 10A and the positive electrode BH of the second battery 10B in the series connection state, and forms a path between both the positive electrodes BH or between both the negative electrodes BL of the first battery 10A and the second battery 10B in the parallel connection state. The current detection unit 14H detects the current flowing through the third conduction path 13.

In the on-board switching device 1 of the present disclosure, the third conduction path 13 forms a path between the electrodes (positive electrodes BH and negative electrodes BL) both in the series connection state and in the parallel connection state, and allows the current to flow therethrough. Since the current detection unit 14H is provided in the third conduction path 13, the current between the first battery 10A and the second battery 10B can be detected by the common current detection unit 14H both in the series connection state and in the parallel connection state. Hence, a device that can detect the current flowing between the first battery 10A and the second battery 10B both in the series connection state and in the parallel connection state is more easily provided.

In an on-board switching device 101 of the present disclosure, the third conduction path 13 includes the first common path 13A and the second common path 13B. The first common path 13A is a conduction path for conducting electricity between both the positive electrodes BH of the first battery 10A and the second battery 10B in the parallel connection state. The second common path 13B is a conduction path for conducting electricity between both the negative electrodes BL of the first battery 10A and the second battery 10B in the parallel connection state. The current detection unit 14H includes the first detection unit 14F which detects the current flowing through the first common path 13A, and second detection unit 14G which detects the current flowing through the second common path 13B.

The on-board switching device 101 of the present disclosure can more accurately grasp the current generated between the first battery 10A and the second battery 10B in the parallel connection state, both in the path on the positive electrode BH side and in the path on the negative electrode BL side.

In the on-board switching device 1 of the present disclosure, the second conduction path 12 includes the inter-positive electrode conduction path 12A and the inter-negative electrode conduction path 12B. The inter-positive electrode conduction path 12A forms a path between both the positive electrodes BH of the first battery 10A and the second battery 10B in the parallel connection state. The inter-negative electrode conduction path 12B forms a path between both the negative electrodes BL of the first battery 10A and the second battery 10B in the parallel connection state. The second conduction path 12 further includes a first fuse 14D provided in the inter-positive electrode conduction path 12A and a second fuse 14E provided in the inter-negative electrode conduction path 12B.

The on-board switching device 1 of the present disclosure can forcibly cut off the energization of the conduction path in both cases where an excessive current is generated in the conduction path between the positive electrodes BH and where an excessive current is generated in the conduction path between the negative electrodes BL in the parallel connection state.

The on-board power supply system 100 includes the power path 20 which is a path for transmitting power from the battery unit 10 both in the series connection state and in the parallel connection state. The power path 20 is provided with the external fuse 20K having a function of cutting off energization of the power path 20. In the on-board switching device 1 of the present disclosure, the rated currents of the first fuse 14D and the second fuse 14E are smaller than the rated current of the external fuse 20K.

In the on-board switching device 1 of the present disclosure, the first fuse 14D and the second fuse 14E can be made smaller in scale. The path between the first battery 10A and the second battery 10B in the parallel connection state is a path through which a relatively low current flows with respect to the power path 20. Therefore, when the first fuse 14D and the second fuse 14E are arranged in such path, the sizes of the first fuse 14D and the second fuse 14E can be easily reduced.

Second Embodiment

Figure 2:
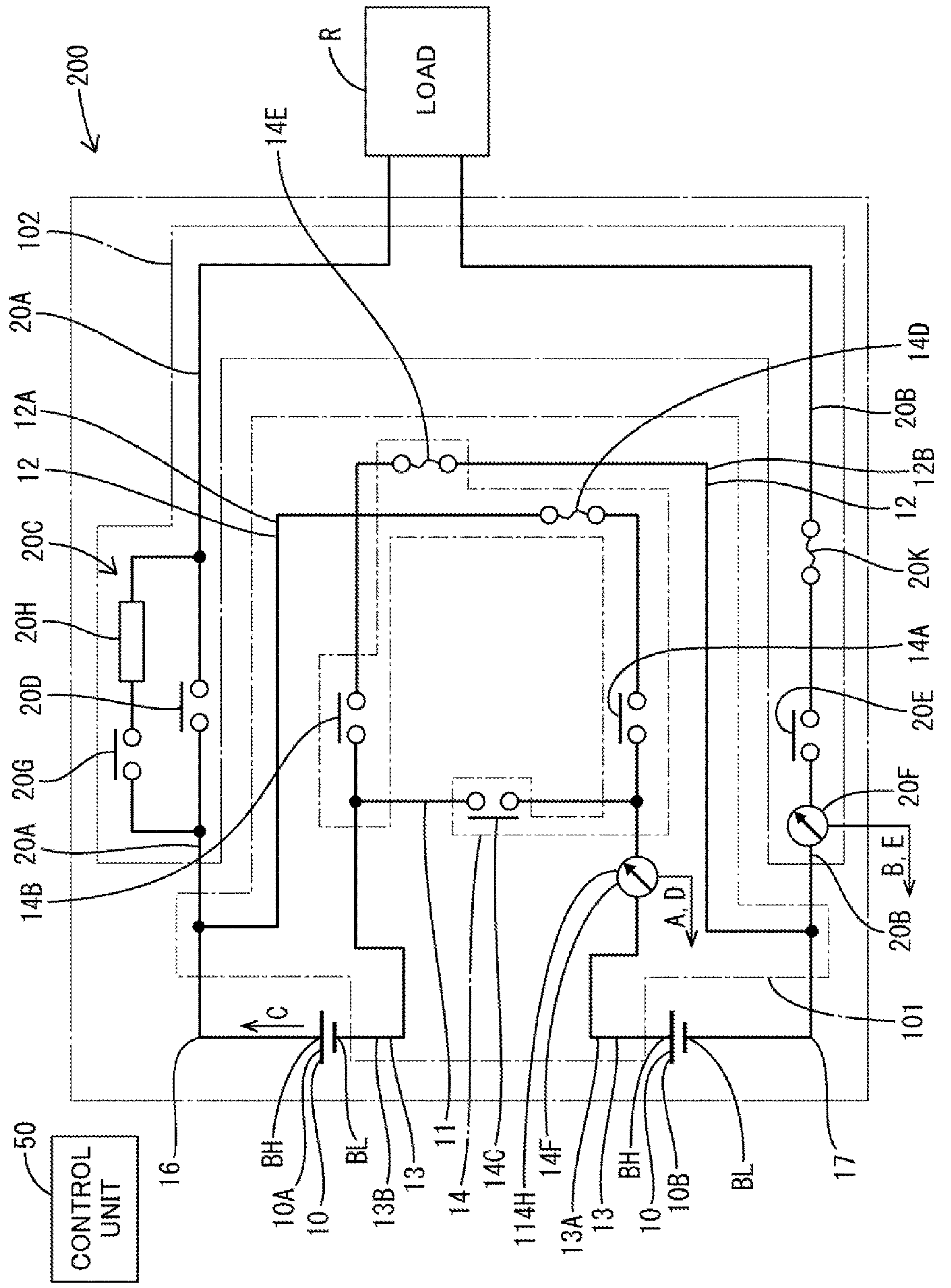
FIG. 2 is a schematic diagram conceptually illustrating an on-board power supply system including an on-board switching device according to a second embodiment.

Next, an on-board power supply system 200 provided with an on-board switching device 101 according to the second embodiment will be described with reference to FIG. 2. The on-board switching device 101 is different from that of the first embodiment in regards that the second common path 13B is not provided with the second detection unit, the low potential side power path 20B is provided with an external current detection unit 20F, and the like. The same configurations as those of the first embodiment are denoted by the same reference signs, and the description of the structure, operation, and effects will be omitted.

[Configuration of Current Detection Unit]

A current detection unit 114H includes the first detection unit 14F. The first detection unit 14F detects the state of the current flowing through the first common path 13A (third conduction path 13). That is, the current detection unit 114H detects the state of the current flowing through a path of one of the first common path 13A and the second common path 13B.

[Configuration of Junction Box Unit]

A junction box unit 102 includes the high potential side power path 20A serving as the power path 20, the low potential side power path 20B serving as the power path 20, the high potential side switch 20D, the bypass unit 20C, the low potential side switch 20E, the external fuse 20K, and the external current detection unit 20F.

The external current detection unit 20F is provided to be interposed between the low potential side switch 20E and the low potential side conduction path 17. The external current detection unit 20F has a configuration similar to that of the first detection unit 14F, for example. The external current detection unit 20F detects the state of the current flowing through the low potential side power path 20B. The current value output from the external current detection unit 20F can be input to the control unit 50, for example.

[Case where Switching Circuit is in Parallel Connection State]

The case of the parallel connection state where the first battery 10A and the second battery 10B of the battery unit 10 are electrically connected in parallel will be described. In this case, for example, the control unit 50 switches the first parallel switch 14A and the second parallel switch 14B to the on state and switches the series switch 14C to the off state. This brings the first battery 10A and the second battery 10B into a state of being electrically connected in parallel. Thus, the switching circuit 14 is brought into the parallel connection state. Thereafter, the high potential side switch 20D and the low potential side switch 20E are switched to the on state, so that power is supplied to the load R.

At this time, the first detection unit 14F provided in the first common path 13A detects, as a current value A, the current generated from the second battery 10B. Together with this, the external current detection unit 20F provided in the low potential side power path 20B detects, as the current value B, the current flowing through the low potential side power path 20B. The first detection unit 14F and the external current detection unit 20F detect currents in the first common path 13A and the low potential side power path 20B simultaneously, for example. Then, the current values A and B are input to the control unit 50 simultaneously. The control unit 50 subtracts the current value A from the current value B. The current value C, which is a calculation result of this subtraction, corresponds to the current generated from the first battery 10A. The current value C thus obtained is a value at the same time as when the first detection unit 14F and the external current detection unit 20F detect the currents in the first common path 13A and the low potential side power path 20B. Thus, the control unit 50 can grasp the magnitudes of the currents generated from the first battery 10A and the second battery 10B as the current values C and A, respectively.

[Case where Switching Circuit is in Series Connection State]

The case of the series connection state where the first battery 10A and the second battery 10B of the battery unit 10 are electrically connected in series will be described. In this case, for example, the control unit 50 switches the first parallel switch 14A and the second parallel switch 14B to the off state and switches the series switch 14C to the on state. This brings the first battery 10A and the second battery 10B into a state of being electrically connected in series. Thus, the switching circuit 14 is brought into the series connection state. Thereafter, the high potential side switch 20D and the low potential side switch 20E are switched to the on state, so that power is supplied to the load R. At this time, the first conduction path 11, the first common path 13A, and the second common path 13B form a path for conducting electricity between the negative electrode BL of the first battery 10A and the positive electrode BH of the second battery 10B.

At this time, the current flowing through the first common path 13A is detected as a current value D by the first detection unit 14F provided in the first common path 13A, and the current flowing through the low potential side power path 20B is detected as a current value E by the external current detection unit 20F provided in the low potential side power path 20B. The first detection unit 14F and the external current detection unit 20F detect currents in the first common path 13A and the low potential side power path 20B simultaneously, for example. Then, the current values D and E are input to the control unit 50 simultaneously. The first battery 10A and the second battery 10B are electrically connected in series. Therefore, the current values D and E have the same magnitude. Thus, the control unit 50 can grasp the magnitude of the current generated from the battery unit 10.

Other Embodiments

The present disclosure is not limited to the embodiments described with reference to the above description and drawings. For example, the features of the embodiments described above or below can be combined in any manner within a range not contradictory. Any of the features of the embodiments described above or below can be omitted unless clearly indicated as being essential. Furthermore, the embodiments described above may be modified as follows.

In the first and second embodiments, the switching circuit switches the first battery 10A and the second battery 10B between the series connection state and the parallel connection state, but the present disclosure is not limited to this. The switching circuit may be configured to switch three or more batteries between the series connection state and the parallel connection state.

In the first and second embodiments, the control unit 50 is provided outside, but the present disclosure is not limited to this. The control unit may be configured to be provided in the on-board power supply system or in the on-board switching device.

In the first embodiment, the external current detection unit 20F is provided in the low potential side power path 20B, but the present disclosure is not limited to this. The external current detection unit may be provided in the high potential side power path.

In the second embodiment, the first common path 13A is provided with the first detection unit 14F, and the second common path 13B is not provided with the second detection unit, but the present disclosure is not limited to this. The second common path may be provided with the second detection unit, and the first common path may not be provided with the first detection unit.

In the first embodiment, the current detection unit is configured to output a current value corresponding to the magnitude of the current flowing through the conduction path. However, the present disclosure is not limited to this, but the current detection unit may include a comparator. In this case, the current detection unit determines whether or not the current value has exceeded a threshold, and when the current value has exceeded the threshold, the current detection unit outputs a threshold excess signal indicating that the current has exceeded the threshold.

It should be understood that the embodiments disclosed herein are illustrative in all respects and are not restrictive. The scope of the present disclosure is not limited to the embodiments disclosed herein, and is intended to include all modifications within the scope indicated by the claims or within the scope equivalent to the claims.

The invention claimed is:

1. An on-board switching device used in an on-board power supply system including a battery unit that includes at least a first battery and a second battery, and a switching circuit that is switched between a series connection state where the first battery and the second battery are connected in series and a parallel connection state where the first battery and the second battery are connected in parallel, the on-board switching device comprising:

the switching circuit;

a first conduction path that is a path where a current is allowed to flow in the series connection state and a current does not flow in the parallel connection state;

a second conduction path that is a path where a current is allowed to flow in the parallel connection state and a current does not flow in the series connection state;

a third conduction path that forms a path between a negative electrode of the first battery and a positive electrode of the second battery in the series connection state, and forms a path between both positive electrodes or between both negative electrodes of the first battery and the second battery in the parallel connection state; and a current detection unit that detects a current flowing through the third conduction path, wherein the third conduction path includes a first common path that is a conduction path for conducting electricity between both the positive electrodes of the first battery and the second battery in the parallel connection state, and a second common path that is a conduction path for conducting electricity between both the negative electrodes of the first battery and the second battery in the parallel connection state, the current detection unit includes a first detection unit that detects a current flowing through the first common path, and a second detection unit that detects a current flowing through the second common path, the second conduction path includes an inter-positive electrode conduction path forming a path between both positive electrodes of the first battery and the second battery in the parallel connection state, and an inter-negative electrode conduction path forming a path between both negative electrodes of the first battery and the second battery in the parallel connection state, the on-board switching device further includes a first fuse provided in the inter-positive electrode conduction path, a second fuse provided in the inter-negative electrode conduction path, a first parallel switch provided to be interposed in the inter-positive electrode conduction path and configured to be switchable between an on state and an off state, and a second parallel switch provided to be interposed in the inter-negative electrode conduction path and configured to be switchable between an on state and an off state, the on-board power supply system includes a power path that is a path for transmitting power from the battery unit both in the series connection state and in the parallel connection state, the power path is provided with an external fuse having a function of cutting off energization of the power path, rated currents of the first fuse and the second fuse are smaller than a rated current of the external fuse, and in the parallel connection state, the first fuse, the first detection unit and the first parallel switch are connected in series, and the second fuse, the second detection unit and the second parallel switch are connected in series.

* * * * *